Aug. 1, 1944.     R. W. JOHNSON ET AL     2,354,755
OIL CONTROL DEVICE
Filed Nov. 23, 1942     2 Sheets-Sheet 1
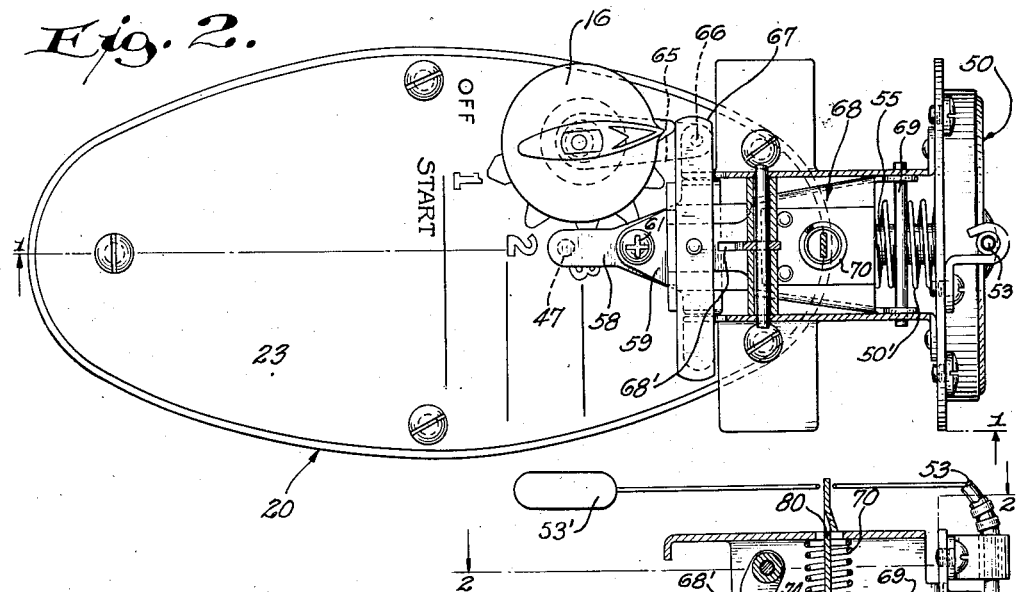
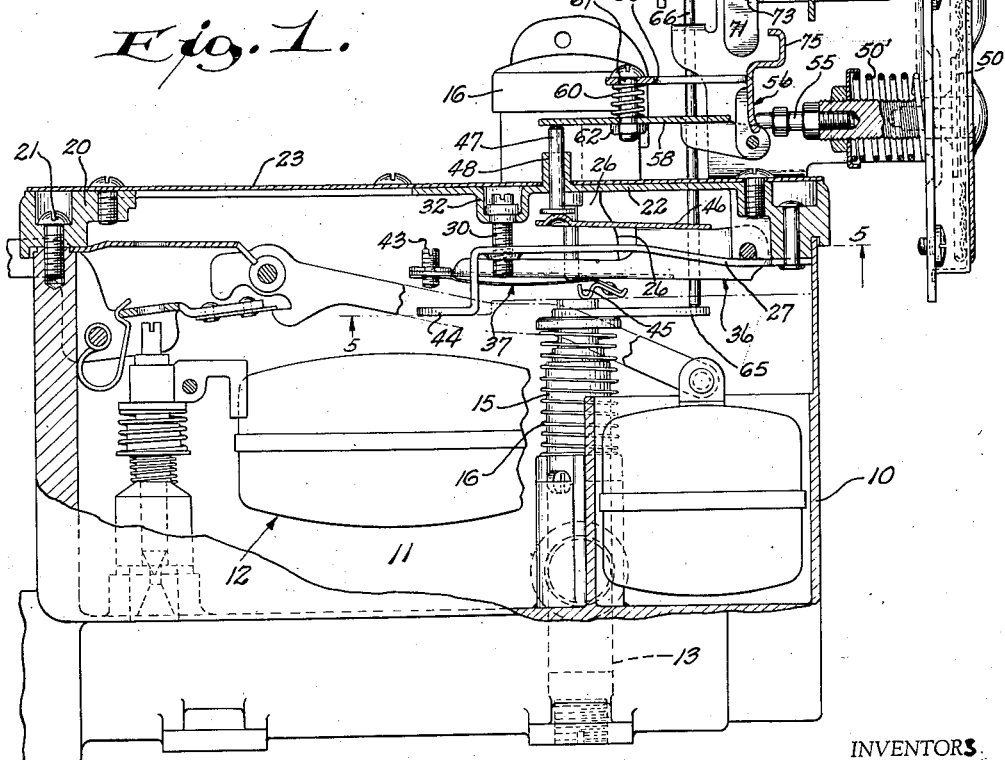
INVENTORS.
ROY W. JOHNSON
WILLIAM A. BIERMANN
VERNON R. PAWELSKY
BY John W. Michael
ATTORNEY.

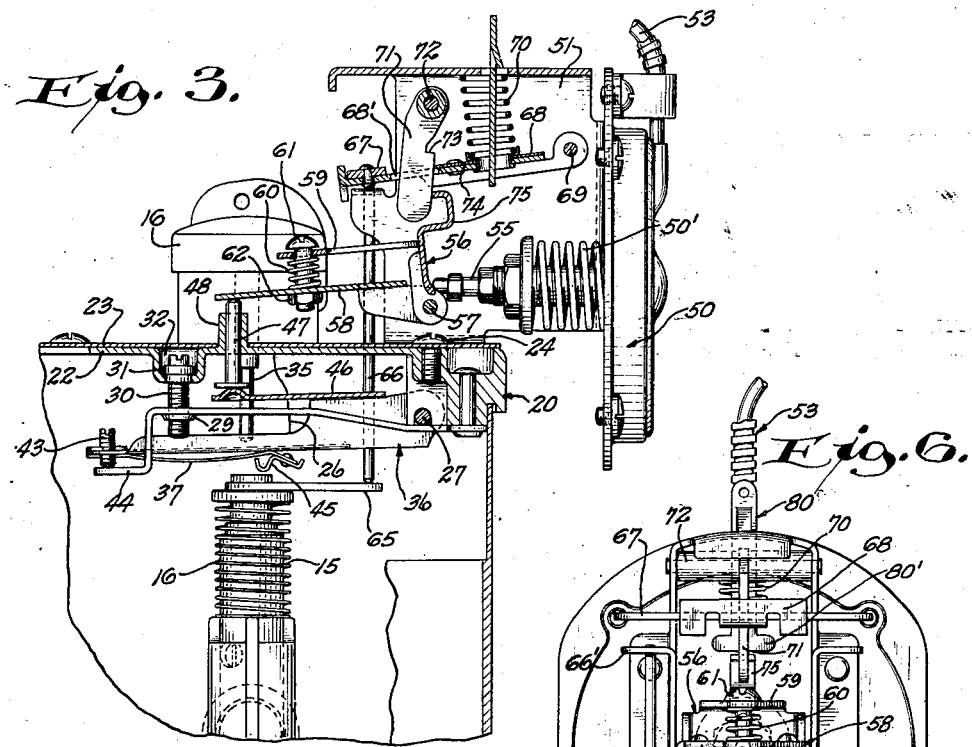
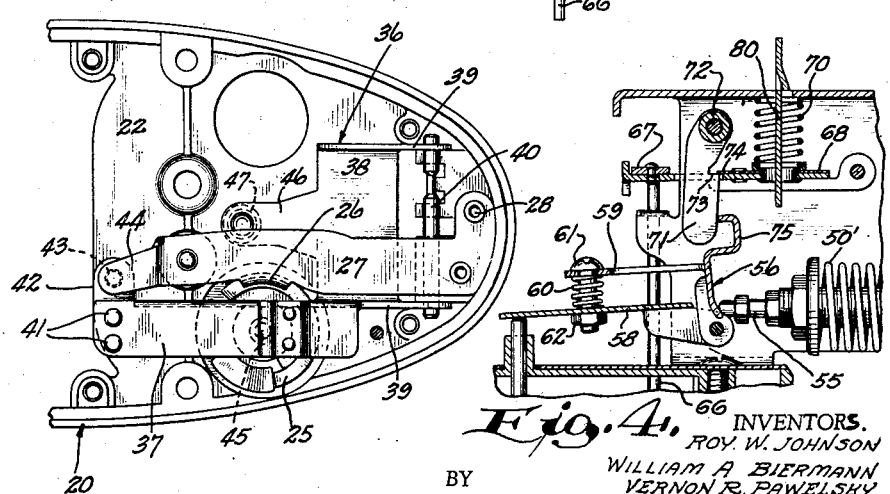

Patented Aug. 1, 1944

2,354,755

UNITED STATES PATENT OFFICE 2,354,755

OIL CONTROL DEVICE

Roy W. Johnson, William A. Biermann, and Vernon R. Pawelsky, Milwaukee, Wis., assignors to Automatic Products Company, Milwaukee, Wis., a corporation of Wisconsin Application November 23, 1942, Serial No. 466,602

12 Claims. (Cl. 236—1)

This invention relates to an improvement in control devices for use in regulating the supply of liquid fuel to gravity feed oil burners.

Devices of this kind, as commonly employed, have a casing provided with a liquid supply chamber in which a constant level of liquid fuel is maintained. The liquid supply chamber is provided with an outlet connected by a pipe line to the burner. The oil flow through the outlet to the burner is under the regulation of a metering valve which is adjustable either manually or thermostatically, or under the conjoint influence of manual and thermostatic control, to provide for a low or a pilot flame at the burner or for intermediate or high flames depending upon the adjustment of the valve.

The present invention proposes to so constitute and organize a device of this character that normally the metering valve is shifted from a manually selected high fire position to a pilot or low fire position under the control of a thermostat which may be subjected and responsive to the temperature of the heater, for example, the bonnet of a furnace, or to any other temperature condition which is determined upon as suitable for controlling purposes. With such an arrangement efficient and safe operation is normally maintained by the shifting of the valve from its intermediate or high fire position to its low or pilot fire position. Under some conditions, however, the mere shifting of the metering valve by the thermostat to low or pilot fire position will not prevent a continued rise in temperature, and unless this is done the heating unit may become overheated with resulting inefficiency and possibly serious hazard. The present invention proposes to prevent such inefficient or dangerous operation of the heating unit and does this by combining with the control device a safety cut-off mechanism operable to forcibly urge the metering valve to completely shut-off position. The safety cut-off mechanism is normally inactive, inasmuch as it is latched against action. But upon a continued rise in temperature, and a consequent increased response of the thermostat, the same thermostat that regulates normal operations releases the latch and causes the safety cut-off mechanism to function. The organization is such, however, that upon restoration of normal conditions the safety cut-off mechanism may be readily re-set, and the device rendered responsive to the influence of its normal controlling instrumentalities.

Another object of the invention is to provide a device having these advantages and capacities, and which is simple, compact, and closely organized in construction, reliable and effective in operation, conveniently adjustable and adapted to be economically manufactured from materials and by means of facilities ordinarily available.

Other objects and advantages reside in certain novel features of the construction, arrangement, and combination of parts which will be hereinafter more fully described and particularly pointed out in the appended claims, reference being had to the accompanying drawings forming a part of this specification, and in which:

Figure 1 is a view partly in longitudinal, vertical cross section and partly in side elevation, showing an oil controlling device embodying the present invention, the metering valve being shown in high fire position;

Figure 2 is a view partly in top plan and partly in horizontal cross section, taken on line 2—2 of Figure 1;

Figure 3 is a fragmentary view in longitudinal, vertical cross section but illustrating the mechanism in the position which it assumes when the safety cut-off mechanism functions and the metering valve is punched to a completely shut-off position;

Figure 4 is a fragmentary sectional view similar to Figure 3, but illustrating the mechanism in the position which it assumes when the metering valve is shifted to low or pilot fire position;

Figure 5 is a fragmentary view in horizontal cross section taken on line 5—5 of Figure 1 and looking in the direction of the arrows; and Figure 6 is a view in end elevation of the control mechanism per se.

Referring to the drawings, it will be seen that the constant level oil control device, in which the present invention is embodied, comprises a main casing, designated generally at 10, and having a liquid supply chamber 11. Liquid fuel is supplied to and maintained at a constant level in the chamber 11 by float-controlled mechanism, designated as a whole at 12. Since this mechanism is well known and widely used, it will not be described in detail. For a full disclosure of this mechanism reference is made to United States Letters Patent 2,068,128, granted January 19, 1937, and United States Letters Patent 2,120,364, granted June 14, 1938.

The liquid flows out of the main supply chamber 11, through an outlet passage 13, which is connected to the burner (not shown). A metering valve, designated generally at 15, regulates the flow of the liquid fuel to the outlet passage. The valve is biased to open position by means of a spring 16 and is shiftable from a high fire position or intermediate fire position to a pilot fire position, and under some conditions to completely shut-off position. A manually operable or adjustable control knob 16 determines the high or intermediate fire position of the valve. As this feature per se forms no part of the present invention, it will not be described in detail. Preferably it embodies the construction described and claimed in Patent No. 2,293,903, issued to Roy W. Johnson for "Compensating valve actuating mechanism," on August 25, 1942.

Applied to the upper open end of the main casing 1 is the cover frame, designated generally at 20, and releasably secured to the body of the casing by suitable number of screws 21. The portion of the cover frame 20 that overlies the metering valve 15 has a transversely extending and horizontally disposed web 22 cast integral therewith and formed with suitable openings to accommodate the various elements hereinafter to be described. The closure of the top of the control device is completed by the provision of a name plate 23 which is releasably secured in position by a suitable number of screws 24.

The manually operable control knob 16 is combined with the cover frame in a manner fully described in the patent referred to immediately above, and it has a cam 25 (see Figure 5) which rides on an abutment lug 26 integral with and upstanding from an adjustable supporting arm 27. The arm 27 is constituted of stiffly resilient metal and has one end riveted, as at 28, to the cover frame. Adjacent its opposite end the arm 27 is formed with an internally threaded bearing 29. An adjusting screw 30 has a swivel connection 31 with a socket 32 provided in the web 22 of the cover frame and is threadedly interconnected with the bearing 29 of the arm 27. The top of the screw 30 is cross slotted and when the cover plate 23 is removed it is accessible for adjustment by means of a screw-driver or other suitable tool.

The knob 16 is provided with a depending pin or stem 35 effective to determine the maximum open position of the metering valve 15.

The pin or stem 35, as well as a thermostatic control to be hereinafter described, both exert their control over the metering valve through a valve-actuating mechanism comprising generally a valve-operating lever, indicated as a whole at 36, and a spring leaf 37. The valve-operating lever 36 is preferably fashioned from sheet metal and is formed at one end with a lateral enlargement 38 provided with integral, apertured flanges 39 through which a pivot pin 40 extends, the pivot pin 40 being suitably supported on the cover frame 20. The valve-operating lever 36 is of the configuration shown to advantage in Figures 1, 3, and 5.

To the under side of the outer end of this lever one end of the spring leaf 37 is riveted, as indicated at 41. The end of the lever to which the spring leaf is riveted is formed with a lateral enlargement 42 having an internally threaded opening therein which receives a low fire stop screw 43. This stop screw 43 is engageable with an abutment or seat provided by a downwardly offset portion 44 of the supporting arm 27 to determine the lower pilot fire position of the metering valve.

The free end of the spring leaf 37 has a valve-engaging member 45 riveted thereto and directly engageable with the upper end of the metering valve.

The valve-operating lever 36 is formed with an integral lever arm 46, the outer end of which engages the lower headed end of an operating pin 47, which is slidably fitted in a bearing 48 provided therefor on the web 22 of the cover frame.

The thermostatic control of the valve includes a thermostat such as a bellows 50, which is secured to and carried by a bracket 51 fastened to the cover frame 20 at the end of the frame adjacent the metering valve 15. The bellows 50 contains an expanding fluid and is of the type which has a capillary tube 53 leading therefrom and usually terminating in a bulb 53' which is subjected to the temperature which is to control the operation of the device. The diaphragm of the bellows 50 has a driving stud or projection 55 secured thereto and projecting outwardly therefrom. The usual loading spring 50' may be combined with the bellows 50 and its driving stud or projection 55. However, the construction of the bellows or other thermostat, per se, forms no part of the present invention. Hence, it is not described in detail.

The bellows stud 55 is in cooperable engagement with a lever 56 fulcrumed on a pivot pin 57 carried by bracket 51. Freely pivoted on the same pin 57 is a second lever 58. The lever 56 has an arm 59 overlying the lever 58. A spring 60 is interposed between the arm 59 of the lever 56 and the lever 58. A bolt 61 passes loosely through an opening provided in the arm 59 and is threadedly engaged with the lever 58. The spring 60 surrounds the shank of the bolt 61. The head of the bolt is engageable with the margin of the bolt hole or opening in the arm 59. A nut 62 is threaded on the lower end of the bolt 61 and is engageable with the margin of the bolt hole in the lever 58 to prevent rotation of the bolt 61. This spring, bolt, and nut arrangement provides a yieldable driving connection between the levers 56 and 58. The lever 58 is in driving engagement with the upper end of the operating pin 47. It is obvious that the levers 56 and 58, together with the yieldable driving connection between them, constitute a motion transmission train between the thermostat 50 and the valve-actuating mechanism so that as the bellows expands and contracts, the metering valve will be opened and closed. This arrangement is operable to shift the metering valve from its low or pilot fire position, shown in Figure 4, to intermediate or high fire position, shown in Figure 1, and vice versa, but is not effective to completely close the metering valve. Low fire stop screw 43, when engaged with its abutment or seat 44, positively prevents further movement of valve-operating lever 36 in a direction to impart closing movement to the valve 15.

The present invention proposes to provide a safety shut-off mechanism operable under certain conditions to completely shut the metering valve. For this purpose the upper end of the metering valve has a laterally projecting arm 65 fixed thereto and engaging the lower end of a thrust rod 66. The rod 66 slides through an opening provided therefor in the cover frame and also through guides 66' provided therefor on the bracket 51 (see Figure 6). The upper end of the pin is disposed below a cross arm 67 of a safety cut-off lever 68. The lever 68 is fulcrumed as at 69 on the bracket 51. A spring 70 is interposed between the lever and the bracket 51 and is under compression so that it tends to throw the lever forcibly downwardly and causes its cross arm 67 to strike the push rod 66, thereby moving the rod 66 downwardly to cause it to depress arm 65 and close the metering valve 16. The lever 68 is, however, normally inactive since it is latched against movement under the influence of the spring 70 by means of a pivoted latch 71. The upper end of the latch 71 is pivoted as at 72 on the bracket 51. The latch projects through a slot 68' formed in the safety cut-off lever 68' and has a latching shoulder 73 engageable with a keeper plate 74 provided at one end of the slot 68'. The lower end of the latch depends below the safety cut-off lever and lies in the path of a trip 75 which may be integrally formed with the lever 56, and which when it engages the latch 71 will shift its latching projection or shoulder 73 out of engagement with the keeper plate 74 and permit the spring 70 to actuate the safety cut-off lever 68.

With this construction, as long as normal conditions obtain, the metering valve is merely moved back from its pilot fire or high fire position. If, however, the valve has been shifted to its pilot fire position, and yet the temperature continues to rise, the bellows will further expand and in so doing will swing the lever 66 from the position shown in Figure 4 to the position shown in Figure 3. This involves compression of the spring 60 and shifting of the latch 71 to its releasing position. As a consequence, the safety cut-off mechanism will be actuated and the metering valve completely closed. Obviously, one of the advantages of this construction is that the same thermostat that controls normal regulation also functions to control the safety cut-off mechanism and effect complete closure of the metering valve.

A T-shaped re-setting bar 80 is provided and the bar extending through an opening at the top of the bracket 51, through the spring 70, and an opening in the safety cut-off lever 68, and having the cross 80' of its T underlying the lever 68 (see Figure 6). This re-setting bar may be connected by a pull chain or pull wire (not shown) to any suitable point of convenient control. When the bar 80 is pulled upwardly, it will swing the safety cut-off lever 68 upwardly and allow the latch 73 to re-engage its keeper so that the device is re-set for normal operation.

While we have shown and described one construction in which the invention may be advantageously embodied, it is to be understood that the construction shown has been selected merely for the purpose of illustration or example, and that various changes in the size, shape, and arrangement of parts may be made without departing from the spirit of the invention or the scope of the subjoined claims.

We claim:

1. An oil control device comprising a casing having a liquid supply chamber provided with an outlet, a metering valve for regulating flow through said outlet, a valve operating lever functioning, when actuated, to shift the valve from high fire position to pilot fire position, and vice versa, a low fire stop cooperable with said lever to limit its movement in the direction in which it is operable to move the valve toward closed position, a thermostat for actuating said lever, a motion transmission train between said thermostat and said lever including a yieldable connection, safety cut-off mechanism biased to punch the valve to closed position and having an operating connection with the valve independently of said motion transmission train, a latch normally retaining the safety cut-off mechanism inactive, and a trip for the latch actuated by said thermostat upon a continued rise in temperature after the thermostat has moved the valve to pilot fire position, said yieldable connection relieving the active elements of the device of excessive strain and insuring effective action when the thermostat functions to actuate the trip.

2. An oil control device comprising a casing having a liquid supply chamber provided with an outlet, a metering valve for regulating flow through said outlet, means for biasing the valve to open position, manually adjustable means cooperable with the valve to determine its high fire position, a valve-operating lever functioning, when actuated, to shift the valve from high fire position to pilot fire position, a low fire stop cooperable with the lever to limit its movement in the direction in which it moves the valve toward closed position, a thermostat for actuating said lever, a motion transmission train between the thermostat and the lever including a yieldable connection, safety shut-off means biased to punch the valve to completely closed position and having a connection with the valve independent of said motion transmission train, a latch for releasably securing the safety cut-off mechanism inactive, and a trip for the latch actuated by the thermostat when the temperature continues to rise a predetermined amount after the thermostat has shifted the valve to pilot fire position, said yieldable connection relieving the thermostat and the elements of said motion transmission train of excessive strain and insuring effective action when the thermostat functions to actuate the trip.

3. An oil control device comprising a casing having a liquid supply chamber provided with an outlet, a metering valve for regulating flow through the outlet, a valve-operating lever for shifting said valve, a low fire stop for limiting the movement of the lever in the direction in which it is effective to shift the valve toward closed position, a thermostat, a motion transmission train between said thermostat and said lever and including a pair of cooperable levers supported for rotation about a common axis, said thermostat having a driving connection with one of said levers, a yieldable driving connection between the members of said pair of levers, the driven member of the pair of levers being connected with the valve-operating lever, in combination with safety cut-off mechanism for punching the valve to closed position, a latch for normally holding the safety cut-off mechanism inactive, and a trip for the latch carried by the member of the pair of levers which has driving engagement with the thermostat.

4. An oil control device comprising a casing having a liquid supply chamber provided with an outlet, a metering valve for regulating flow through said outlet, actuating mechanism for shifting the metering valve from high fire position to low fire position and vice versa, a thermostat controlling the action of said actuating mechanism, safety cut-off mechanism for punching the metering valve to completely closed position, a latch for normally retaining the safety cut-off mechanism inactive, and a trip for the latch actuated by the thermostat when the temperature continues to rise after the thermostat causes the actuating mechanism to shift the valve to pilot fire position.

5. An oil control device comprising a casing having a liquid supply chamber provided with an outlet, a metering valve for regulating flow through said outlet, actuating mechanism for shifting the metering valve from high fire position to low fire position, and vice versa, a thermostat controlling the action of said actuating mechanism, a safety cut-off mechanism for punching the metering valve to completely closed position, said safety-cutoff mechanism being normally inactive, and means controlled by said thermostat for bringing the safety cut-off mechanism into action when the temperature continues to rise after the thermostat has caused the actuating mechanism to shift the valve to pilot fire position.

6. An oil control device comprising a casing having a liquid supply chamber provided with an outlet, a metering valve for regulating flow through said outlet, actuating mechanism for shifting the metering valve from high fire position to low fire position, and vice versa, a thermostat controlling the action of said actuating mechanism, safety cut-off mechanism for punching the metering valve to completely closed position, a latch for normally retaining the safety cut-off mechanism inactive, a trip for the latch actuated by the thermostat when the temperature continues to rise after the thermostat causes the actuating mechanism to shift the valve to pilot fire position, and manually operable means for resetting said safety cut-off mechanism.

7. An oil control device comprising a casing having a liquid supply chamber provided with an outlet, a metering valve for regulating flow through said outlet, actuating mechanism for shifting the metering valve from high fire position to low fire position, and vice versa, a thermostat controlling the action of said actuating mechanism, safety cut-off mechanism for punching the metering valve to completely closed position and including a safety cut-off lever biased to a position to punch the metering valve to completely closed position, a pivoted latch cooperable with the safety cut-off lever to retain it in inactive position, and a trip for the latch actuated by said thermostat when the temperature continues to rise after the thermostat causes the actuating mechanism to shift the valve to pilot fire position.

8. An oil control device comprising a casing having a liquid supply chamber provided with an outlet, a metering valve for regulating flow through said outlet, actuating mechanism for shifting the metering valve from high fire position to low fire position, and vice versa, a thermostat controlling the action of said actuating mechanism, safety cut-off mechanism for punching the metering valve to completely closed position and including a safety cut-off lever biased to a position to punch the metering valve to completely closed position, said lever having a slot therein, a keeper plate fixed to the lever at one end of the slot, a pivoted latch extending through the slot and having a latching shoulder cooperative with the keeper plate to retain the safety cut-off lever in inactive position, and a trip for the latch actuated by the thermostat when the temperature continues to rise after the thermostat has caused the actuating mechanism to shift the valve to pilot fire position.

9. An oil control device comprising a casing having a liquid supply chamber provided with an outlet, a metering valve for regulating flow through the outlet, a valve-operating lever for shifting said valve, a low fire stop for limiting the movement of the lever in the direction in which it is effective to shift the valve toward closed position, a thermostat, a motion transmission train between said thermostat and said lever and including a pair of cooperable levers supported for rotation about a common axis, said thermostat having a driving connection with one of said levers, a yieldable driving connection between the members of said pair of levers, the driven member of the pair of levers being connected with the valve-operating lever, in combination with safety cut-off mechanism for punching the valve to closed position and including a safety cut-off lever biased to a position to punch the metering valve to completely closed position, a pivoted latch cooperable with the safety cut-off lever to retain it in its inactive position, said latch having a portion disposed adjacent said pair of levers, the member of the pair of levers which has driving engagement with the thermostat having an extension functioning to trip the latch when the temperature continues to rise after the thermostat has caused the actuating mechanism to shift the latch to pilot fire position.

10. An oil control device comprising a casing having a liquid supply chamber provided with an outlet, a metering valve for regulating flow through said outlet, actuating mechanism for shifting the valve from high fire position to low fire position, and vice versa, safety cut-off mechanism for punching the valve to closed position, and a single thermostat for regulating the action of both of said mechanisms.

11. An oil control device comprising a casing having a liquid supply chamber provided with an outlet, a metering valve for regulating flow through said outlet, actuating mechanism for shifting the valve from high fire position to low fire position, and vice versa, safety cut-off mechanism for punching the valve to closed position, and a single thermostat for regulating the action of both of said mechanisms, in combination with manually operable means for resetting the safety cut-off mechanism.

12. An oil control device comprising a casing having a liquid supply chamber provided with an outlet, a metering valve for regulating flow through said outlet, manually adjustable means cooperable with the valve to determine its high fire position, a pilot fire stop for determining the pilot fire position of the valve, actuating mechanism for shifting the valve from high fire position to pilot fire position, and vice versa, safety cut-off mechanism for punching the valve to closed position, and a single thermostat for regulating the action of both of said mechanisms.

ROY W. JOHNSON.
WILLIAM A. BIERMANN.
VERNON R. PAWELSKY.